United States Patent
Neff et al.

[11] Patent Number: 6,016,039
[45] Date of Patent: Jan. 18, 2000

[54] CONTROL PROCESSES FOR LINEAR VOICE COIL ACTUATOR

[75] Inventors: Edward A. Neff, Rancho Santa Fe; Michael S. Sheaffer, Escondido; Michael A. Ferris, Vista; David Huang, Carlsbad; Steven Haidos, Vista; Kieran Boyle, San Diego; Dennis Stom, Solana Beach, all of Calif.

[73] Assignee: Systems, Machines, Automation Components Corporation, Carlsbad, Calif.

[21] Appl. No.: 08/985,493

[22] Filed: Dec. 5, 1997

[51] Int. Cl.⁷ .................................................. H02K 41/00
[52] U.S. Cl. ............................................. 318/115; 310/12
[58] Field of Search .................................. 310/12, 13, 14; 29/739, 740, 741, 743, 744, 834; 318/115

[56] References Cited

U.S. PATENT DOCUMENTS

| | | | |
|---|---|---|---|
| 3,709,379 | 1/1973 | Kaufeldt | 414/591 |
| 3,958,740 | 5/1976 | Dixon | 228/102 |
| 4,575,652 | 3/1986 | Gogue | 310/49 R |
| 4,653,794 | 3/1987 | Atlas | 294/88 |
| 4,759,124 | 7/1988 | Snyder et al. | 29/834 |
| 4,809,430 | 3/1989 | Maruyama et al. | 29/834 |
| 4,913,613 | 4/1990 | Hirschmann | 414/751 |
| 5,055,725 | 10/1991 | LaSota | 310/14 |
| 5,059,884 | 10/1991 | Shah et al. | 318/701 |
| 5,175,456 | 12/1992 | Neff et al. | 310/13 |
| 5,315,189 | 5/1994 | Neff et al. | 310/12 |
| 5,317,222 | 5/1994 | Neff et al. | 310/13 |
| 5,416,397 | 5/1995 | Mazzara et al. | 318/696 |
| 5,446,323 | 8/1995 | Neff et al. | 310/12 |
| 5,458,387 | 10/1995 | Conway et al. | 294/100 |
| 5,596,460 | 1/1997 | Greenberg et al. | 360/78.14 |

*Primary Examiner*—Thomas M. Dougherty
*Assistant Examiner*—Judson H. Jones
*Attorney, Agent, or Firm*—Nydegger & Associates

[57] ABSTRACT

A controller for a voice coil actuator includes sensors that are connected with the actuator probe to monitor both the linear and angular position of the probe, as well as the axial and rotational forces on the probe. Using predetermined instructions, the probe can be controlled in either an open loop mode or in a closed loop feedback mode, for either static or dynamic operations. For static operations, the axial and rotational forces on the probe can be controlled by referencing set values for the forces which are to be applied to/by the probe. For dynamic operations, in addition to the axial and rotational forces on the probe, the linear and angular movements of the probe can be controlled. In the closed loop mode, linear and angular positions, velocities, and accelerations can be used for control. In its operation, the controller selectively establishes linear and rotational movements and forces for the probe which are useful in accomplishing the wide variety of tasks wherein such forces and movements are required.

19 Claims, 2 Drawing Sheets

CONTROL PROCESSES FOR LINEAR VOICE COIL ACTUATOR

FIELD OF THE INVENTION

The present invention pertains generally to servo control systems and servo actuated controller processes. More specifically, the present invention pertains to processes for controller systems which can be selectively engaged with the working probe of a voice coil actuator to control positions, movements and force applications of the probe in both translation and rotation. The present invention is particularly, but not exclusively, useful as a computerized controller for a voice coil actuator which implements probe routines in accordance with reprogrammed time sequences.

BACKGROUND OF THE INVENTION

Many tasks can be envisioned wherein it is either desired or required to impose a particular force against a workpiece at a predetermined position or location. It may be of extreme importance for the proper accomplishment of the task that the force have a particular magnitude and that it be applied with a specific orientation for a prescribed duration. For those tasks which require precision and accuracy during the application of very specific forces, or the combined application of variable forces in different directions, it is particularly important that the forces be properly controlled.

In recent years it has become widely appreciated that voice coil actuators can be used for precise and accurate work in many different applications where extremely small forces are used and extremely small tolerances are required. For example, such a voice coil actuator is disclosed and claimed in U.S. Pat. No. 5,175,456 which issued to Neff et al. for an invention entitled "Workpiece Transporter", and which is assigned to the same assignee as the present invention. Further, it is known that voice coil actuators are well suited for moving a work probe in translation, z, and rotation, θ, in plane translation, x–y, and various combinations of these movements. For example, a notice of allowance has been received for U.S. application Ser. No. 08/620,504 which was filed by Neff et al. on Mar. 22, 1996 for an invention entitled "Actuator for Translational and Rotary Movement" and which is assigned to the same assignee as the present invention.

Recognizing there are many separate and distinct tasks which can be accomplished by a work probe, and specifically one that is moveable with extreme accuracy and precision in both translation and rotation, the issue becomes one of control. In order to control a work probe in any particular application, it is first useful to properly position the work probe in a start position. For work probes of a voice coil actuator, this start position will be defined by an axial position, z, and an angular orientation, θ. From this start position, the forces, positions, and the movements of the probe will be dictated by the particular task to be performed. Regardless whether the probe is required to measure, test, move, alter, adjust, verify, or perform any combination of these type functions on a workpiece, it is recognized that a high degree of control is required.

In light of the above it is an object of the present invention to provide computer/controller processes for a voice coil actuator, and a method for its use, which precisely moves the probe of the actuator in combinations of translation and rotation in accordance with preprogrammed sequences along and around various control axes. It is another object of the present invention to provide computer/controller processes for a voice coil actuator, and a method for its use, which selectively moves the probe of the actuator in translation or rotation, and selectively applies linear or rotational forces on a workpiece, in accordance with task requirements. Yet another object of the present invention is to provide computer/controller processes for a voice coil actuator, and a method for its use, which can be programmed by the operator to accomplish a specific task, and then subsequently re-programmed to accomplish additional tasks. Another object of the present invention is to provide a computer/controller for a voice coil actuator which is relatively easy to manufacture, is simple to use, and is comparatively cost effective.

SUMMARY OF THE PREFERRED EMBODIMENTS

In accordance with the present invention, computer/controller processes for a voice coil actuator include selectively operable open loop and/or closed loop feedback controls. More specifically, once the voice coil actuator is appropriately positioned in the x–y plane, the voice coil actuator has a probe that is selectively moveable in both axial translation (z), and axial rotation (θ). These separate movements are made in response to respectively applied independent static and dynamic control forces ($F_z$ and $F_\theta$). In dynamic conditions, the computer/controller individually monitors and controls the z, θ movements of the probe as well as the forces $F_{zd}$ and $F_{\theta d}$ which cause these movements. In a static condition, the computer/controller controls the forces $F_{zs}$ and $F_{z\theta}$ to establish a proper reactive force on a workpiece. At all times, the exact location of the probe in both z and θ relative to predetermined datums is known.

In order to monitor the exact location of the probe in z and θ, the computer/controller is connected with respective z and θ encoders which are calibrated to respective datums. These encoders monitor the translational position (z) and the rotational position (θ) of the probe during its operation. Additionally, during movements of the probe, the linear and angular velocities and accelerations of the probe are calculated by the computer/controller and used for purposes of probe control. To make these calculations, the time rate of change in the translational position of the probe is calculated by the computer/controller to determine the actual linear velocity ($dz/dt=v$) of the probe. Further, the time rate of change of the probe's linear velocity can be calculated to determine linear acceleration ($dv/dt=a$) of the probe. Similarly, the time rate of change in the rotational position of the probe can be calculated by the computer/controller to determine the actual rotational velocity ($d\theta/dt=\omega$) of the probe, and the time rate of change of the velocity can be calculated to determine the angular acceleration ($d\omega/dt=\alpha$) of the probe. These actual values can then be individually compared with predetermined and preprogrammed values of v, a, ω and α to create feedback signals which are useful to control the forces ($F_{zd}$ and $F_{\theta d}$) that are required for proper movement of the probe.

In addition to the z/θ encoders disclosed above, the computer/controller can also be connected with a load cell and a torque meter which are typically mounted on the probe itself. Both the load cell and the torque meter are calibrated to determine the magnitude of reactive forces on the probe. Specifically, the load cell is used to measure reactive axial forces against the probe ($F_{zs}$), while the torque meter is used to measure reactive twisting or rotational forces against the probe ($F_{\theta s}$). These reactive forces, $F_{zs}$ and $F_{\theta s}$, can be monitored by the computer/controller and varied in accordance with preprogrammed instructions in the computer. Thus, under both static and dynamic conditions, the forces Fz and $F_\theta$ can be adjusted to counteract or impose predetermined forces on the probe and/or workpiece.

In the operation of the computer/controller of the present invention, a start point is established for the probe for each particular task/function that is to be performed. In all instances, at the start point for each separate task or operation, an initial position (z and θ) and an initial force ($F_z$ and $F_\theta$) are established. For dynamic operations of the probe, an axial force $F_{zd}$ can be applied to move the probe axially in accordance with preprogrammed instructions. As indicated above, this can be an open loop operation or a closed loop feedback control operation. In a closed loop mode, error signals for the probe position (z), velocity (v) and/or acceleration (a) can be used to control Fzd for axial movement of the probe. Likewise, still in a dynamic operation, a rotational force $F_{\theta d}$ can be applied to rotate the probe in accordance with preprogrammed instructions. Again, like the translational movement of the probe, control over the angular or rotational movement of the probe can be either an open loop or a closed loop operation. If a closed loop mode is used, error signals for probe position (θ), velocity (ω) or acceleration (α) can be used to control the rotational motion of the probe.

As intended for the present invention, several different or repetitive tasks/functions may be performed in a particular sequence. Further, several sequences may be combined and used together, in concert, for a particular program or routine. Importantly, the variables which are to be controlled during the operation of the computer/controller can be controlled individually or jointly. Stated differently, some of the variable controls may not be used, and may even be disconnected, for any particular task/function/routine.

As indicated above, many different kinds of tasks may be accomplished by the probe of a voice coil actuator wherein axial and/or rotational movements are involved, or wherein translational and/or rotational forces are required. Depending on the particular task or operation to be performed, various combinations of these movements and forces may be used. In an overview, the forces acting on the probe may be either for the purpose of moving the probe, or for the purpose of creating an action by the probe against a workpiece. Furthermore, movement of the probe may be either for the purpose of pre-positioning the probe so that, subsequently, the probe can do work on a workpiece, or movement of the probe may be for the purpose of measuring or determining the location of the workpiece relative to the datum of the probe. Also, once contact has been made with the workpiece, additional forces exerted by the probe on the workpiece may be for grasping and moving the workpiece, or for reconfiguring the workpiece in some way.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
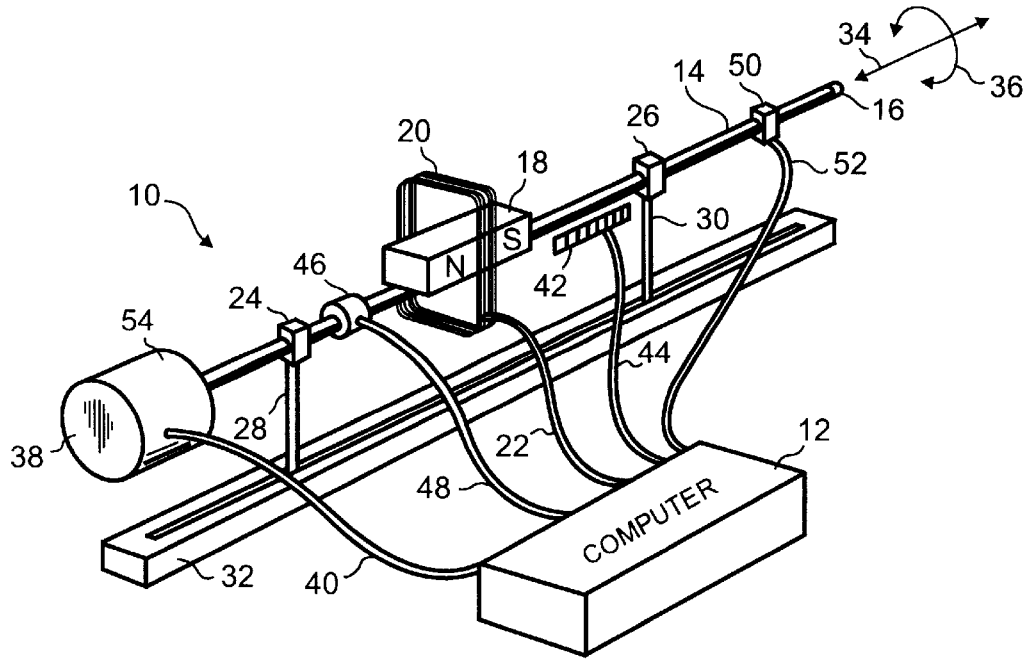
FIG. 1 is a generalized schematic perspective view of the operative components of a voice coil actuator shown with appropriate electronic connections to a computer/controller.

Referring initially to FIG. 1, the operative components of a system for controlling a voice coil actuator are collectively shown and generally designated 10. As shown, the system 10 includes a computer/controller 12 which may of any type well known in the pertinent art which has the capacity to handle sufficient data for accomplishment of the tasks and functions disclosed below. Also, included in the system 10 is a rod or probe 14, which is part of the voice coil actuator. Further, the probe 14 has a gripper 16 which can be selectively mounted at the distal end of the probe 14 for engagement with a workpiece (not shown). As intended for the present invention, the gripper 16 may have many different configurations, each of which will depend on the particular task to be performed by the system 10. For instance, the gripper 16 may mechanically or magnetically engage a workpiece to grasp and move the workpiece from one location to another. Further, the gripper 16 may use suction to engage a workpiece or it may use an adhesive for this same purpose. Further, the gripper may not actually engage with a workpiece but, rather, may merely touch the workpiece for the purpose of determining the exact location of the workpiece. On the other hand, the gripper 16 may be a tool, such as a cutter or a polisher, which is mounted for movement by the probe in a manner which will accomplish work on a workpiece. Suffice it to say, the present invention envisions the use of a multitude of different type grippers 16, each of which are individually designed and configured to perform any one or more of a variety of tasks.

In accordance with a typical configuration for a voice coil actuator, the system 10 of the present invention includes a magnet 18 which interacts with an electrical coil 20. Preferably, the magnet 18 is a permanent magnet, however, electrical magnets of superconducting magnets may also be used. For the particular configuration shown in FIG. 1, the magnet 18 is shown to be a permanent magnet which is affixed to the probe 14, to move with the probe 14 (i.e. moving magnet). In this case, the coil 20 needs to be stationarily or fixedly mounted on a base member (not shown). It is to be appreciated, however, that the positions of the magnet 18 and the coil 20 could easily be reversed. Namely, the coil 20 could somehow be mounted on the probe 14 to move with the probe 14, and the magnet 18 should then be stationarily or fixedly mounted on the base member. Further, it is to be appreciated that a plurality of magnets 18 or a plurality of coils 20 can be used.

In all possible configurations for the magnet 18 and coil 20, the magnetic field of the magnet 18 is specifically positioned to interact with the electromagnetic field of the coil 20. Due to this interaction, forces can be generated between the magnet 18 and the coil 20 which will act to move the probe 14. Specifically, the computer 12 is operatively connected with a voltage source which supplies a controlled current to the coil 20 through line 22. Depending on the amount of current flowing through the coil 20, and the direction in which this current flows through the coil 20, the direction and magnitude of the interactive force between the magnet 18 and the coil 20 can be controlled in a manner that is well understood by the skilled artisan.

FIG. 1 also shows that a pair of rotational bearings 24, 26 are attached to the probe 14, and that these bearings 24, 26 are respectively attached to rods 28, 30 which are slidingly mounted on a guide 32. More specifically, the bearings 24, 26 are of a type which do not move in an axial direction relative to the probe 14. The bearings 24, 26 do, however, allow for the rotation of the probe 14 about its longitudinal axis. Thus, through the interaction of the bearings 24, 26 and the rods 28, 30, movements of the probe 14 are defined. Specifically, the probe 14 is confined in translation to substantially linear movement parallel to the guide 32 in forward and reverse directions as indicated by the arrow 34. Further, the probe 14 is confined in its rotational movement to rotate clockwise or counterclockwise substantially about its longitudinal axis as indicated by the arrow 36. Due to the fact that friction represents the force threshold on the probe 14, it is desirable that the bearings 24, 26 have minimal friction forces. Air bearings may be used.

As disclosed above, translational movements of the probe 14 are made in the directions of arrow 34 and are due to the interactive forces which are generated between the magnet 18 and coil 20. On the other hand, rotational movements of the probe 14 are made around the axis of probe 14 in the directions of arrow 36 and are due to the operation of a rotary motor 38. For purposes of the present invention, the rotary motor 38 can be a conventional DC brushed motor, or any similar type motor well known in the art, which develops a torque that is proportional to the current. Preferably, the rotary motor 38 is a direct drive type which is mounted on the probe 14 and moves with the probe 14 in translation. Activation of the rotary motor 38 is accomplished by electronic signals (current) which are passed from the computer/controller 12 to the rotary motor 38 via line 40.

Control over the translational and rotational movements of the probe 14 is possible due to the use of several sensors in the system 10. Specifically, these sensors include a z-encoder 42 which is connected with the computer 12 via line 44, and a θ-encoder 46 which is connected with the computer 12 via line 48. For purposes of the present invention the z-encoder is preferably a fine resolution linear encoder and can be any type of contact or non-contact linear encoder well known in the art. Similarly, the θ-encoder 46 can be of a type well known in the art. The z-encoder 42, as shown in FIG. 1, is positioned to detect translational movement of the probe 14 in the directions of arrow 34 while the θ-encoder 46 is positioned to detect rotational movement of the probe 14 in the direction of arrow 36. As will be appreciated by the skilled artisan, the simultaneous use of both the z-encoder 42 and the θ-encoder 46 will provide sufficient information to determine the exact location of probe 14. Also, by comparing positions, the distance traveled by the probe 14, in both translation and rotation, can be determined. Dynamic movement control of the probe 14, however, requires more. Specifically, to achieve dynamic control of the probe 14, linear and rotational velocities, as well as linear and rotational accelerations, may be required.

Open loop control of the probe 14 under dynamic and static conditions is rather straight forward. First, it is to be appreciated that a proper position in the x–y plane is established. Then, for dynamic conditions, if a change in the z direction is required for probe 14, the computer 12 can simply activate the coil 20 with an appropriate amount of current for an appropriate amount of time. Similarly, if a change in angular orientation θ is desired, the rotary motor 38 can be appropriately activated. Of course, a combination of movements in z and θ can be made. The accuracy of these movements can be checked by referencing the z-encoder 42 and the θ-encoder 46. Subsequently, appropriate changes can be made, if necessary. Under static conditions, i.e. once the probe 14 has been properly positioned in x–y–z–θ, an appropriate axial force, $F_{zs}$, or rotational force, $F_{\theta s}$, can be applied to the probe 14. The accuracy of these forces can be checked by respectively monitoring the load cell 50 or the torque meter 54.

Figure 2:
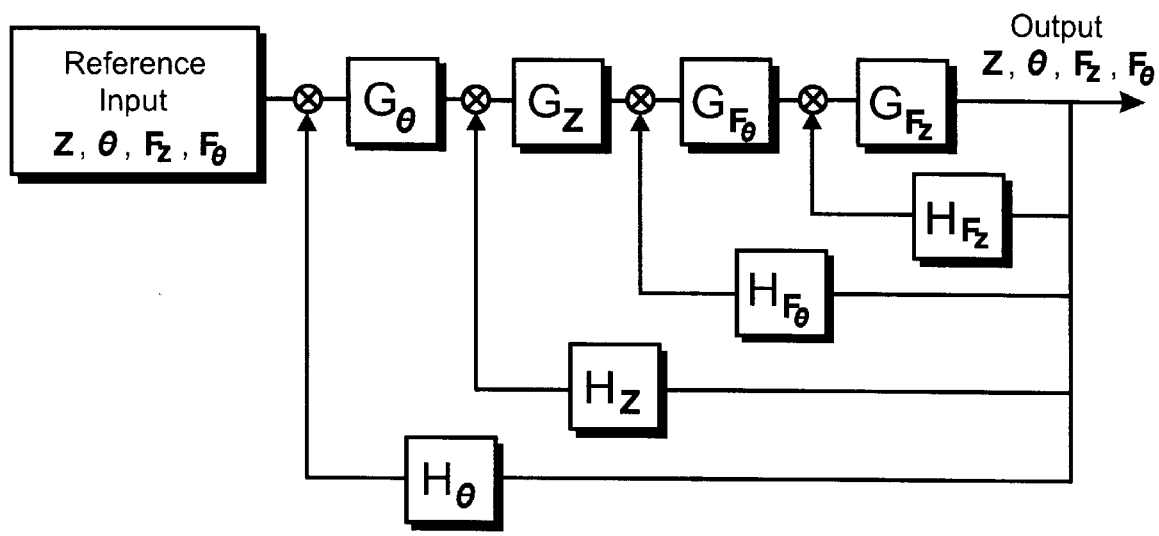
FIG. 2 is a diagram for the closed loop feedback control system which can be used to control the probe of a voice coil actuator.

In addition to open loop control of the probe 14, various closed loop feedback controls are available for the system 10 of the present invention. In FIG. 2 it will be seen that the present invention contemplates closed loop feedback control for: a) the linear axial position (z) of the probe 14; b) the angular position (θ) of the probe 14; c) the axial force ($F_z$) exerted on the probe 14 in the z direction; and d) the rotational force ($F_\theta$) exerted on the probe 14 around its longitudinal axis. As shown in FIG. 2, each of these variables involves a respective dynamic unit G, and a feedback element H. As will be appreciated by the skilled artisan, the dynamic units G and the feedback elements H can be engineered to satisfy the particular requirements for each specific task. Additionally, as required, feedback control for the linear and angular velocities (v, ω) and the linear and angular accelerations (a, α) can be used. It is also to be noted that each feedback control loop can be used selectively. Stated differently, particular feedback control loops need not be used. For example, if only linear translation of the probe 14 is required, then the feedback control loops which pertain to the angular movement of probe 14 (i.e. θ, ω, α, $F_{\theta s}$ and $F_{\theta d}$) need not be used. On the other hand, only angular movement, rather than translational movement, may be required. In that case, the feedback control loops which pertain to the translational movement of probe 14 (i.e. z, v, a, $F_{zs}$ and $F_{zd}$) need not be used.

Figure 3:
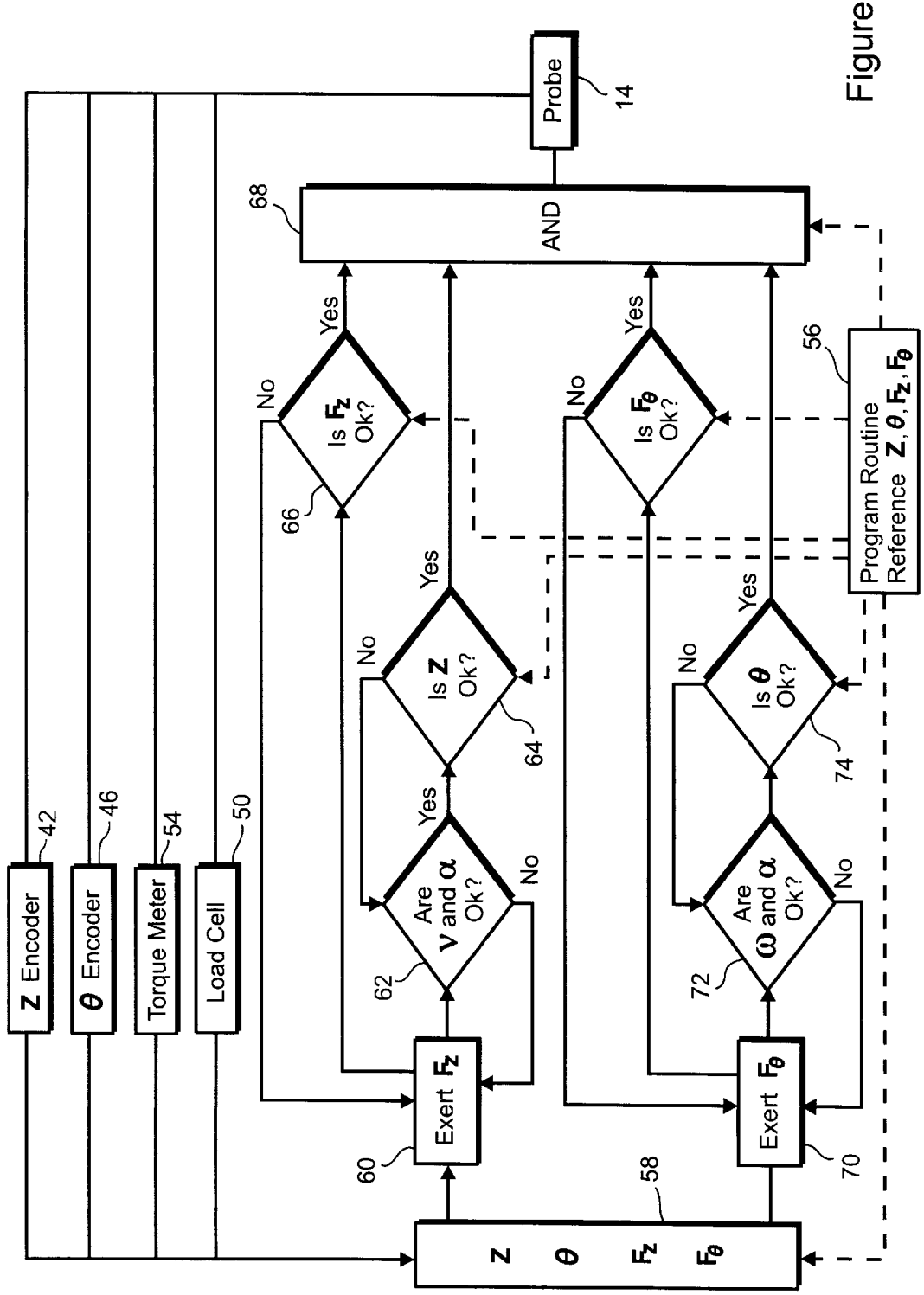
FIG. 3 is a logic chart for the control operations of a computer/controller for a voice coil actuator.

In FIG. 3, block 56 indicates that routines are provided which include time sequences and preprogrammed reference values for the motion variables that are involved in both translational and rotational movements of the probe 14. Typically, these reference values will be programmed into computer/controller 12. In accordance with the above disclosure, the z encoder 42, the θ encoder 46, the load cell 50 and torque meter 54 are all connected with probe 14 to respectively monitor and obtain the actual values for z, θ, $F_z$ and $F_\theta$ indicated in block 58. With these measurements, the computer/controller 12 is then able to control the static and dynamic forces acting on probe 14 in both the axial and radial directions.

For linear translational movement of the probe 14 in a direction along its longitudinal axis, or for the exertion of an axial force on the probe 14, the block 60 of FIG. 3 indicates that an axial force $F_z$, is to be generated. For dynamic conditions, as disclosed above, the change of position (z) for probe 14, its velocity (v), and/or its acceleration (a) may be individually or collectively monitored. As indicated by the decision blocks 62 and 64, the dynamic force ($F_{zd}$) acting on probe 14 may be appropriately altered. On the other hand, for static conditions wherein there is no change in the position (z) of probe 14, and thus there is no velocity or acceleration, a static force $F_{zs}$ may be imposed. In this case, block 66 indicates that the force $F_{zs}$ must be of a certain magnitude. For either static or dynamic conditions, the block 68 indicates that the position z (and its associated variable v and a), as well and the magnitude of the axial force $F_z$ (i.e. $F_{zs}$ or $F_{zd}$) must conform to the particular preprogrammed routine of block 56.

Exemplary applications for control processes that involve linear translational movement of the probe 14 in the z direction include routines for open loop control of force variations and closed loop control from maintenance of force magnitude or position stability. As an example of open loop force variations, consider an application wherein the force $F_z$ is to be increased or decreased over time. To do this, a routine (block 56 FIG. 3) is programmed into computer 12 which requires that the static force $F_{zs}$ be varied in accordance with a preprogrammed time sequence in order to accomplish a specific task. After the probe 14 has been positioned against a workpiece (not shown), the static force, $F_{zs}$, is applied to the probe 14 until the preprogrammed magnitude is indicated by load cell 50. Thereafter, $F_z$ can be incrementally varied over time. In this case, the actual position z of the probe 14 is immaterial. On the other hand, and also by way of example, if a constant force is to be maintained on the workpiece during the performance of the task, the position and movement of the workpiece during application of the force $F_z$ may be critical. In this case, any variation in $F_z$ that is detected by the load cell 50, or any movement of the work piece and probe 14 that is detected by the z-encoder 42, must be accounted for with an appropriate change in either the position z or the force $F_z$ that is applied to the probe 14. For position control in a closed loop mode, any variation in the position of the probe 14 will be detected by the z-encoder 42 as an error signal ($e_z$). To maintain position, feedback control can be used to nullify the error signal ($e_z$). This, as suggested by FIG. 2 can be done by making appropriate changes in the applied force $F_z$. It is to be appreciated that all of the above situations are merely examples. The actual routines (block 56) which can be programmed into the computer 12 are to be determined by the operator.

For angular rotational movement ($\theta$) of the probe 14 about its longitudinal axis, or for the exertion of a rotational force on the probe 14, the block 70 of FIG. 3 indicates that an angular force $F_\theta$, is to be generated. For dynamic conditions, as disclosed above, the change of angular position ($\theta$) for probe 14, its angular velocity ($\omega$), and/or its angular acceleration ($\alpha$) may be individually or collectively monitored. As indicated by the decision blocks 72 and 74, the dynamic force ($F_{\theta d}$) acting on probe 14 may be appropriately altered. On the other hand, for static conditions wherein there is no change in the position ($\theta$) of probe 14, and thus there is no velocity or acceleration, a static force $F_{\theta s}$ may be imposed. For either static or dynamic conditions, the block 68 again indicates that the angular position $\theta$ (and its associated variable $\omega$ and $\alpha$), as well and the magnitude of the rotational force $F_\theta$ (i.e. $F_{\theta s}$ or $F_{\theta d}$) must conform to the program routine of block 56.

Exemplary applications for control processes that involve rotational movement of the probe 14 in the $\theta$ direction, similar to the examples given above for the z direction, include routines for open loop force variations and closed loop force magnitude maintenance. As an example of open loop force variations, consider an application wherein the force $F_\theta$ is to be increased or decreased over time. To do this, a routine (block 56 FIG. 3) is programmed into computer 12 which requires that the static force $F_\theta$ be varied in accordance with a preprogrammed time sequence in order to accomplish a specific task. After the probe 14 has been positioned against a workpiece (not shown), the static force, $F_{\theta s}$ is applied to the probe 14 until the preprogrammed magnitude is indicated by torque meter 54. Thereafter, $F_\theta$ can be incrementally varied over time. In this case, the actual angular position $\theta$ of the probe 14 is immaterial. On the other hand, and also by way of example, if a constant force $F_\theta$ is to be maintained on the workpiece during the performance of the task, the position and movement of the workpiece during application of the force $F_\theta$ may be critical. In this case, any variation in $F_\theta$ that is detected by the torque meter 54, or any movement of the work piece and probe 14 that is detected by the $\theta$-encoder 46, must be accounted for with an appropriate change in either the position $\theta$ or the force $F_\theta$ that is applied to the probe 14. For position control in a closed loop mode, any variation in the angular position of the probe 14 will be detected by the $\theta$-encoder 46 as an error signal ($e_\theta$). To maintain position, feedback control can be used to nullify the error signal ($e_\theta$). This, as also suggested by FIG. 2 can be done by making appropriate changes in the applied force $F_\theta$. It is to be appreciated that all of the above situations are merely examples. As with the examples given above for linear control of the probe 14, it is to be appreciated that these are also merely examples. Again, the actual routines (block 56) which can be programmed into the computer 12 are to be determined by the operator.

Considering FIG. 3 in its entirety, together with the closed loop controls suggested in FIG. 2, it will be appreciated that both translational and rotational movements, as well as axial and angular forces, may be controlled by methods of the present invention. As intended for the present invention, a plethora of possible combination of forces and movements on the probe 14 are intended.

While the particular control processes for linear voice coil actuator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for controlling the linear and angular reaction of a probe of a voice coil actuator in accordance with pre-programmed instructions, the method comprising the steps of selectively:

determining an actual linear position of the probe (z);

comparing z with the preprogrammed instructions to generate a linear error signal ($e_z$);

exerting a dynamic force ($F_{zd}$) on the probe in response to $e_z$ to move the probe in translation for position control;

exerting a variable static force ($F_{zs}$) on the probe when $e_z$ is equal to zero;

determining the actual angular position of the probe ($\theta$);

comparing $\theta$ with the preprogrammed instructions to generate an angular error signal ($e_\theta$);

exerting a dynamic angular force ($F_{\theta d}$) on the probe in response to $e_\theta$ to move the probe in rotation for angular control; and exerting a variable static angular force ($F_{\theta s}$) on the probe when $e_\theta$ is equal to zero.

2. A method as recited in claim 1 further comprising the steps of:

calculating a linear velocity (v) for the probe; and comparing v with the preprogrammed instructions to refine $F_{zd}$.

3. A method as recited in claim 2 further comprising the steps of:

calculating a linear acceleration (a) for the probe; and comparing the acceleration with the preprogrammed instructions to refine $F_{zd}$.

4. A method as recited in claim 1 further comprising the steps of:

calculating an angular velocity ($\omega$) for the probe; and comparing $\omega$ with the preprogrammed instructions to refine $F_{\theta d}$.

5. A method as recited in claim 4 further comprising the steps of:

calculating an angular acceleration ($\alpha$) for the probe; and comparing a with the preprogrammed instructions to refine $F_{\theta d}$.

6. A method as recited in claim 1 wherein Z and θ are determined using a respective encoder mounted on the probe.

7. A method as recited in claim 1 wherein the preprogrammed instructions define a routine including a sequence of time dependent values for z, θ, $F_{zd}$, $F_{zs}$, $F_{\theta d}$, and $F_{\theta s}$.

8. A method as recited in claim 7 wherein at least one of the time dependent values for z, θ, $F_{zd}$, $F_{zs}$, $F_{\theta d}$, and $F_{\theta s}$ is equal to zero.

9. A method as recited in claim 8 wherein the routine is repeated.

10. A controller for a linear voice coil actuator, said actuator having a probe moveable in translation (z) and rotation (θ) in response to a control force exerted on the probe, the controller comprising:

a first encoder means connected to the probe for determining the position of the probe in translation (z);

a second encoder means connected to the probe for determining the position of the probe in rotation (θ);

a voltage means for exerting said force (F) on the probe;

a computer means for monitoring actual Z, θ and F of the probe, said computer means having an input for receiving a probe routine, with said probe routine including a sequence of predetermined values for Z, θ, and F; and a comparator means in said computer means for comparing said actual Z, θ, and F with said predetermined values for Z, θ and F in said probe routine for controlling movement of said probe.

11. A controller as recited in claim 10 wherein said control force F includes:

a linear dynamic component ($F_{zd}$) for moving the probe in axial translation;

an angular dynamic component ($F_{\theta s}$) for moving the probe in rotation about its axis;

linear static component ($F_{zs}$) for reacting to axial forces against the probe; and an angular static component ($F_{\theta s}$) for reacting to tortional forces against the probe.

12. A controller as recited in claim 11 further comprising a load cell mounted on the probe for measuring $F_{zs}$.

13. A controller as recited in claim 11 further comprising a torque meter mounted on the probe for measuring $F_{\theta s}$.

14. A controller as recited in claim 11 further comprising an electronic calculator means in said computer means, for calculating a linear velocity (v), a linear acceleration (a), an angular velocity (ω) and an angular acceleration (α) for the probe.

15. A controller as recited in claim 14 wherein said comparator uses values for z, v, and a for controlling $F_{zd}$.

16. A controller as recited in claim wherein said comparator uses values for θ, ω, and a for controlling $F_{\theta d}$.

17. A controller as recited in claim 14 wherein the preprogrammed instructions define a routine including a sequence of time dependent values for z, θ, $F_{zd}$, $F_{zs}$, $F_{\theta d}$, and $F_{\theta s}$.

18. A method as recited in claim 17 wherein at least one of the of time dependent values for z, θ, $F_{zd}$, $F_{zs}$, $F_{\theta d}$, and $F_{\theta s}$ is equal to zero.

19. A method as recited in claim 18 wherein the routine is repeated.

\* \* \* \* \*